United States Patent
Knowles

[11] Patent Number: 6,087,599
[45] Date of Patent: Jul. 11, 2000

[54] TOUCH PANELS HAVING PLASTIC SUBSTRATES

[75] Inventor: Terence J. Knowles, Barrington, Ill.

[73] Assignee: The Whitaker Corporation, Wilmington, Del.

[21] Appl. No.: 08/977,095

[22] Filed: Nov. 24, 1997

Related U.S. Application Data

[60] Provisional application No. 60/031,505, Nov. 27, 1996.

[51] Int. Cl.[7] .................................................. G08C 21/00
[52] U.S. Cl. .................................... 178/18.04; 178/19.01; 178/19.02
[58] Field of Search ...................................... 345/173, 177, 345/179, 156; 178/18.01, 18.04, 18.03, 19.01, 19.02, 19.03

[56] References Cited

U.S. PATENT DOCUMENTS

| | | | |
|---|---|---|---|
| H1109 | 10/1992 | Roberts et al. | 340/705 |
| Re. 33,151 | 1/1990 | Adler | 340/712 |
| 3,673,327 | 6/1972 | Johnson et al. | 178/18 |
| 4,295,214 | 10/1981 | Thompson | 367/140 |
| 4,406,045 | 9/1983 | Schwab | 29/527.2 |
| 4,511,760 | 4/1985 | Garwin et al. | 178/18 |
| 4,642,423 | 2/1987 | Adler | 178/18 |
| 4,644,100 | 2/1987 | Brenner et al. | 178/18 |
| 4,645,870 | 2/1987 | Adler | 178/19 |
| 4,680,429 | 7/1987 | Murdock et al. | 178/19 |
| 4,700,176 | 10/1987 | Adler | 340/365 R |
| 4,746,914 | 5/1988 | Adler | 340/712 |
| 4,791,416 | 12/1988 | Adler | 340/712 |
| 4,931,965 | 6/1990 | Kaneko et al. | 364/560 |
| 5,072,427 | 12/1991 | Knowles | 367/118 |
| 5,097,102 | 3/1992 | Yoshimura et al. | 178/18 |
| 5,260,521 | 11/1993 | Knowles | 178/18 |
| 5,329,070 | 7/1994 | Knowles | 178/18 |
| 5,451,723 | 9/1995 | Huang et al. | 178/18 |
| 5,484,967 | 1/1996 | Yanagisawa et al. | 178/19 |
| 5,591,945 | 1/1997 | Kent | 178/19 |
| 5,648,643 | 7/1997 | Knowles et al. | 178/19 |
| 5,854,450 | 12/1998 | Kent | 178/18.04 |

FOREIGN PATENT DOCUMENTS

| | | | |
|---|---|---|---|
| 0364983 A2 | 10/1989 | European Pat. Off. | G05K 11/14 |
| 0 364 983 A2 | 4/1990 | European Pat. Off. | G06K 11/14 |
| 0435203 A2 | 12/1990 | European Pat. Off. | G05K 11/14 |
| 0 435 203 A2 | 3/1991 | European Pat. Off. | G06K 11/14 |

OTHER PUBLICATIONS

Mechanics of Deformable Bodies Lectures on Theoretical Physics, vol. II, Arnold Sommerfeld, translated from German (Academic Press), 1950, pp. 105–107 and 326–335.

*Primary Examiner*—Vijay Shankar
*Assistant Examiner*—Mansour M. Said

[57] ABSTRACT

The present invention is directed to a touch panel for use in a touch position sensor. The touch panel includes a substrate fabricated at least partially from plastic materials. The plastic may be a polystyrene and/or copolymers of polystyrene. The touch panel utilizes transverse acoustic waves having a frequency in the range of 0.2 to 2.0 Megahertz to detect a touch on the touch panel.

10 Claims, 4 Drawing Sheets

TOUCH PANELS HAVING PLASTIC SUBSTRATES

This application claims the benefit of U.S. Provisional Application Ser. No. 60/031,505, Filed Nov. 27, 1996.

FIELD OF THE INVENTION

The present invention relates to substrates for acoustic touch sensitive devices fabricated from plastic materials, specifically polystyrene and copolymers of polystyrene.

BACKGROUND OF THE INVENTION

Touch panels for various applications have employed mechanical waves in a substrate as an alternative to other technologies used in touch position sensors such as infrared or light detection beams and resistive or capacitive arrays. Touch position panels based on the use of mechanical waves are primarily substrates in which an acoustic wave is propagated in the substrate and a touch at a position on the substrate results in absorption of at least a portion of the wave propagated in the substrate. By use of electronics, the position in an XY coordinate plane is determined and thus the position of the touch. The use of touch position panels has applications in the computer, pager, cellular phone, personal digital assistants and radio markets.

As stated, acoustic waves have been utilized in touch position panels in the past. To this end surface acoustic waves (SAW) have been utilized in the past and were seen to have certain drawbacks discussed below. Thereafter, bulk waves, preferably transverse acoustic waves were utilized in acoustic touch panels. The use of transverse or shear waves is well known in the art, and the advantages thereof are delineated in U.S. Pat. Nos. 5,243,148 and 5,329,070, the disclosures of which are specifically incorporated here in by reference. In the these referenced patents, the medium of propagation of the acoustic shear waves is preferably glass. Touch position sensors incorporating shear or transverse waves utilizing glass as the substrate has the attendant advantage of a substantially improved insensitivity to absorption by surface contaminants when compared to surface acoustic waves. The fact that surface acoustic waves are more readily absorbed than bulk waves, to include shear waves, has both advantages and disadvantages in applications to touch position panels. The fact that SAW waves are more readily absorbed has the clear disadvantage in that they are more susceptible to absorption by contaminant. However, the fact that SAW waves are more readily absorbed when compared to the absorption of shear waves results in an improved sensitivity, which is clearly desirable in touch panel applications. Fortunately, the relative insensitivity of bulk waves can be overcome electronically. As is delineated in the above incorporated patents to Knowles, shear waves can be generated and received with greater efficiencies than surface acoustic waves on glass substrates. The result is that the signal received and processed has a substantially greater signal-to-noise ratio when compared to surface acoustic waves. Accordingly, suitable electronics can be utilized to effect adequate signal processing of a shear wave in a touch position panel.

While it is true that shear waves propagating in a glass substrate provide dramatic improvements compared to surface acoustic waves, there are clear drawbacks to the use of glass as the substrate in various applications. To this end, the use of touch position sensors in portable devices to include readily transportable computers as well as radios, cellular phones, and pagers require a much more durable and less breakable touch position substrate for acoustic touch position substrate applications. In addition, one of the particular consideration that must be given in the design of an acoustic touch position sensor for the support of shear waves is the thickness of the substrate as clearly delineated in the '148 and '070 references recited above. To this end, the thickness of the touch position sensor is generally desired to be small enough so as to not support higher order modes and Lamb waves. However, it is often required to bond the substrate to another plate of material in order to provide the structural rigidity required. That is, a piece of glass used as a substrate that will support shear waves but will not readily support spurious modes may be too thin for almost any application and often it is required to bond the thin piece of glass to another plate so as to provide structural rigidity. In plastic, this consideration becomes less important as the intrinsic nature of plastics enable a greater degree of durability for a given thickness when compared to glass. Additionally, the weight of the substrate is to some extent a practical consideration in portable devices, and clearly the density of plastic is less than that of glass resulting in a lighter substrate, for a given size, which has attendant benefits in portable device as is readily obvious.

Unfortunately, the vast majority of plastic materials tested for use as a substrate in a three dimensional mechanical acoustic touch position sensor have losses that are not tolerable for commercial application. That is, while many plastic materials provide an attractive alternative to glass from the stand point of durability and weight in portable applications, the losses for materials such as acrylics and other plastics are unacceptably high at practical operating frequencies.

Accordingly, what is needed is a plastic substrate that will support shear waves in an acoustic touch position sensor having the durability of plastic and the attendant benefits thereof while having acceptable signal transmission levels at suitable frequencies.

SUMMARY OF THE INVENTION

The present invention is drawn to the use of polystyrene and copolymers of polystyrene as the substrate for application in acoustic touch position sensors for supporting shear acoustic waves. The polystyrene materials incorporated in acoustic touch panels of the present disclosure have the desired structural rigidity and therefore the durability required for portable applications while maintaining losses at functional frequencies within an acceptable range. To this end, while other plastic materials experience losses on the order of 10 dB/inch at frequencies of 0.5 megahertz, the polystyrene materials used in the present invention have losses on the order of 1.8 dB/inch. When compared to glass, these are acceptable as glass has losses on the order of 0.6 to 0.7 dB/inch at the above enumerated frequencies. While it is true that the losses at the frequencies of operation in plastic are greater when compared to glass, it is well known to one of ordinary skill in the art that the sensitivity of a touch position sensor is inversely proportional to the product of the density and the velocity of sound in the particular medium. In the present application, because the velocity of sound in glass is greater than the velocity of sound in polystyrene and the density of glass is greater than the density of polystyrene, it follows that the sensitivity of polystyrene, acoustic touch panels is greater; In fact, the use of polystyrene as a touch position substrate results in a sensitivity which is five to seven times greater than that of glass at the frequencies of operation disclosed herein.

Another advantage of the invention of the present disclosure is the ready adaptability to various techniques utilized in the transmission and reception of acoustic shear waves, the preferred acoustic wave of the present invention. The present invention envisions the use of an array as is disclosed in the above incorporated patents to Knowles. Because the use of plastics requires a lower frequency of propagation, the use of arrays could be problematic. That is, in glass the use of lower frequencies requires array reflector spacing to be too great to be practical. This is not the case in plastic, because the velocity of sound is lower and accordingly the wavelength of sound is proportionately lower. Furthermore, the fact that lower frequencies are utilized in the plastic touch position sensor in the present disclosure often translate to a lower cost for signal processing hardware. Discrete transducers can be used in a touch position sensor based on the present disclosure as well. To this end, the use of an individual coupled sending and receiving transducer at along adjacent edges of the substrate can be utilized, foregoing the use of a single transducer for the X direction and one for the Y direction with reflective arrays located along the outer edges of the substrate.

Finally, it is of interest to note that while the preferred acoustic waves utilized in the present invention are zeroth order horizontally polarized shear waves in the bulk, it is possible to utilize other acoustic waves to include higher order shear waves in the bulk, surface acoustic waves and Love waves in the touch panel devices of the present disclosure.

OBJECTS, FEATURES, AND ADVANTAGES

It is an object of the present invention to have an acoustic wave touch panel having improved durability.

It is a feature of the present invention to have a touch panel for propagating acoustic shear waves having a substrate of plastic.

It is a further feature of the present invention to have a particular plastic material with a loss characteristics on the order of magnitude of that of glass at a particular frequency.

It is a further feature of the present invention to have a touch panel for propagating surface acoustic waves having a substrate of plastic.

It is an advantage of the present invention to have a substrate having a increased sensitivity when compared to glass at a particular frequency.

DETAILED DESCRIPTION OF THE INVENTION

Figure 1:
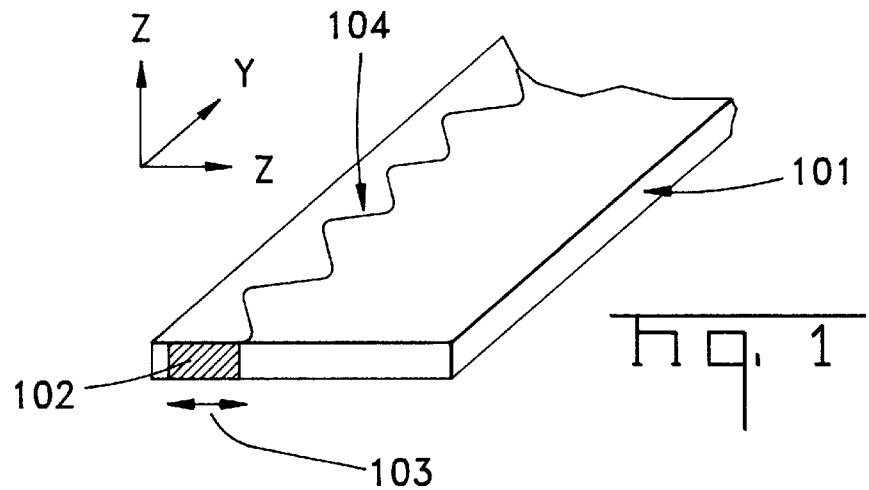
FIG. 1 is a perspective view of a typical transverse three dimensional acoustic wave in a plastic substrate.

Turning to FIG. 1 a typical transverse or shear wave in the bulk of a substrate is shown. The substrate 101 is preferably polystyrene plastic and can be commercially available Styron TN666D resin as well as 615, 685 resins manufactured by Dow Plastics Inc. Additionally, Rexolute polystyrene a copolymer of styrene and divinylbenzene can be used as the substrate.

FIG. 1 shows that a transducer 102 disposed on a side surface of the substrate having an oscillatory function as shown by arrow 103 which produces a transverse wave or a shear wave 104, the preferred propagated wave of the present invention. This wave has a propagation direction (in the Y direction) which is perpendicular to the direction of the oscillation effected by the transducer (the X direction) 102. This is in contrast to a longitudinal or compression wave in which the direction of propagation and the direction of oscillation are parallel. Again and as is clear to one of ordinary skill in the art, these are waves in the bulk of the substrate, in stark contrast to surface acoustic waves, a clearly different and distinguishable physical phenomenon in which the wave exists in the surface of the medium. The distinguishing features can be found through a study of the above referenced patent application as well as the book *Mechanics of Deformable Bodies Lectures on Theoretical Physics, Volume II,* Arnold Sommerfeld, translated from German (Academic Press), 1950, pgs 105–107 and 326–335, the disclosure which is specifically incorporated herein and by reference.

Figure 2A:
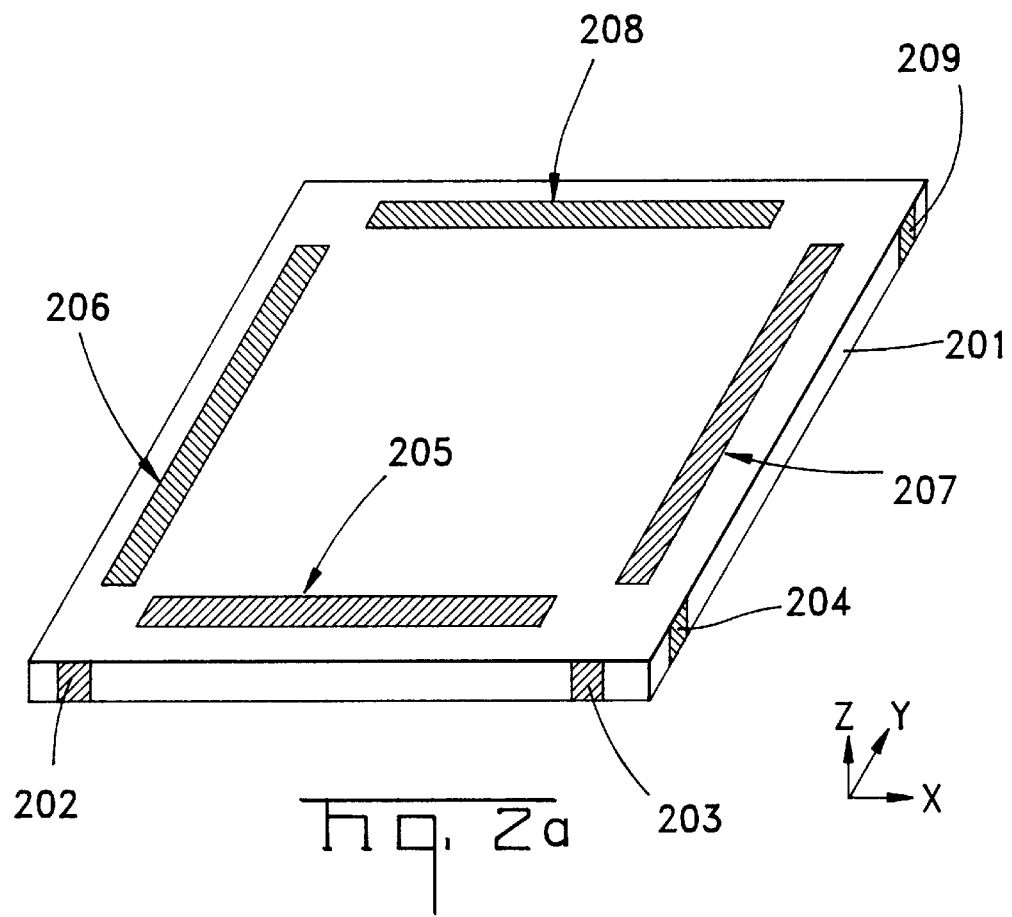
FIG. 2a shows the plastic substrate of the present invention using reflective arrays about the outer perimeter of the substrate.
Figure 2B:
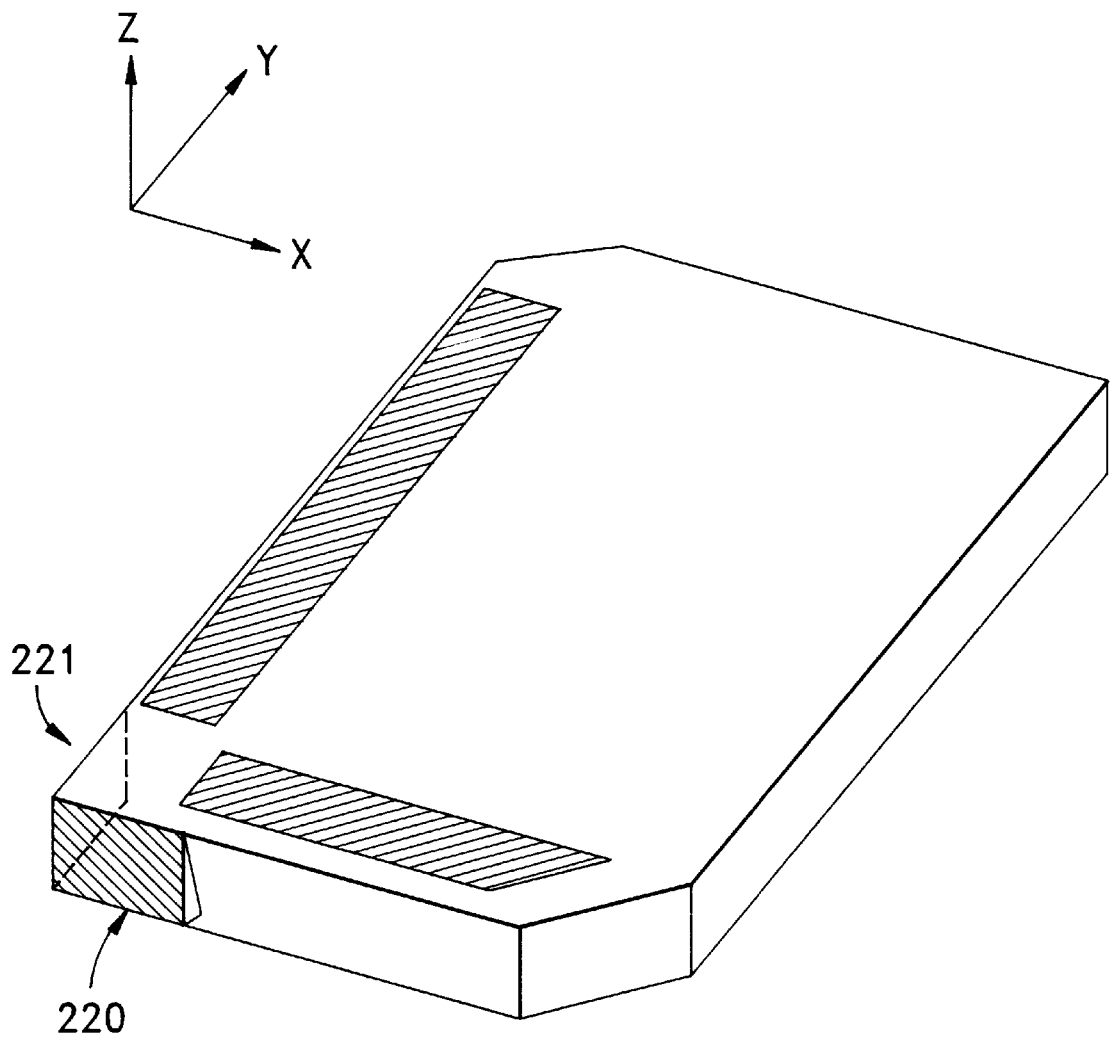
FIG. 2b is the preferred embodiment of the present invention using reflective arrays.

Turning to FIG. 2, a typical substrate for use as a touch panel utilizing the acoustic shear wave is shown. As is disclosed in the '148 and '070 references, the solution to the wave equation in an elastic medium such as that shown in FIG. 1 is a non-dispersive zeroth order horizontally polarized shear wave or ZOHPS wave. To this end, a polystyrene plastic substrate 201 have disposed thereon transducers 202,203,204 and 209. These transducers are preferably lead zirconium titanate (PZT) although lithium niobate transducers will suffice in this role. As is disclosed in the above reference patents to Knowles, the reflective arrays 205,206, 207,208 function to direct a portion of the acoustic wave admitted to a given transducer to a corresponding reflective array or surface on the other side of the substrate. The preferred embodiment for the reflective array is as disclosed in FIG. 2b, in which there is a y-axis transducer 220 and an x-axis transducer 221 with the 45 degree cut in the substrate as is disclosed in the above referenced patent ('148). On the other hand as is shown in FIG. 2a a four transducer version is shown. Isolating transducer 202 for purposes of illustration, a transverse acoustic wave emanating from 202 would be reflected from the array 206 and reflect a portion perpendicularly in the X direction toward the reflector 207. A portion of this wave is then reflected to transducer 203 and through signal processing electronics If there is a loss of energy due to a touch, (that is energy of the acoustic wave is absorbed through a touch), this will be evident in the received signal. In this manner a first coordinate can be realized. Additionally, through an identical analysis of the transducers in the orthogonal direction, a second coordinate of the touch would be realized. For most applications, the X and Y coordinates are all that is needed. A further advantage of acoustic sensors is that the degree of absorption of acoustic energy can be determined through signal processing. The degree of absorption depends partly on the surface area of an absorber in contact with the sensor. This can be modulated by varying the pressure applied to the absorber, hence the absorption can be modulated to create a pressure variable called the z-coordinate. Depending on the application, ability to sense touch pressure, as well as touch position is a useful characteristic of the present invention.

The reflective arrays of the present invention can be manufactured by a variety of techniques in the plastic. To this end, as is disclosed in U.S. Pat. No. 5,648,643 to Knowles and Bremigan, there is an etching process which can effect the spacing and depth of the etching of the arrays as is desired. This patent application, assigned to the assignee of present invention is specifically incorporated herein and by reference. Additionally, an injection molding technique as well as an embossing technique as are disclosed in U.S. application Ser. No. 08/977,089, now abandoned, filed on even date herewith can be utilized in the manufacture of the touch panels having the reflective arrays thereon. The disclosure of the above referenced patent application is specifically incorporated herein by reference. To this end, injection molding technique as well as an embossing technique as are discussed herein can be used.

Injection molding is a viable approach to the fabrication of touch sensitive arrays for propagating acoustic waves. The injection molding technique disclosed herein can be used to fabricate substrates having the reflective arrays as well as those in which a reflective array is not used. The resultant product are as shown in FIG. 2a–3b. To this end, polystyrene and copolymers thereof are the preferred materials for the substrate. In order to fabricate reliable and durable substrates by injection molding, it is necessary to provide a hard coat of preferably polycarbonate or an acrylic material having a thickness on the order of 2–3 mils. This hard coat is used to prevent scratching as well as chipping or other imperfections due to normal use. Additionally, nanoparticulate technology can be used. In the technique of injection molding, a suitable mold as is well known to one of ordinary skill in the art having the mold for the array spacing therein has polystyrene or a copolymer thereof injected after the hard coat sheet is disposed in the mold in the form of a mold liner. Thereafter, the polystyrene in liquid form is injected into the mold and on top of the mold liner as the hardcoat. The substrate is then allowed to cool and the resultant product is prepared for use by removing the excess polystyrene about the edges due to normal molding techniques. The hardcoat material, as stated above, is on the order of 2–3 mils thick and will not effect the sensitivity of the device as the typical wavelength at the desired frequency range are on the order of 100 mils. Accordingly, there is substantially no ill effects due to the hardcoat. Thereafter, the transducers can be disposed as is desired and is as shown in FIGS. 2a–3b. The transducers can be disposed manually or in a semi automatic form through the use of the tape carrier with the transducers and electrical connectors disposed thereon. Another technique which can be used in order to fabricate the devices in mass production at a reduced cost and having the resultant product be extremely reliable from a performance standpoint it is embossing. In the preferred embossing technique of the present disclosure, an extruded sheet of polystyrene or a copolymer thereof having the hardcoat of polycarbonate or acrylic in a thickness of 2–3 mils disposed thereon is heated. The heated sheet is then embossed with a plate at a suitable pressure, with the plate having a negative of the pattern of the reflective array disposed thereon. This embossing step results in highly reliable arrays fabricated in large quantity and in mass production. Again, the tape carrier can be used to dispose the transducers in the desired locations along the edges as is shown in FIGS. 2a–3b.

It is of particular interest to note that the polystyrene exhibits acceptable losses for shear modes in frequency ranges that correspond to wavelengths that are not practical in glass, but can be readily utilized in plastic. To this end, the reduction of frequency to the order of 1 megahertz in glass would result in a wavelength that would require array spacing for the reflective arrays to be much to great, resulting in serious problems due to diffraction and signal selectivity. On the other hand, the use of plastic in a frequency of to on the order of 1 Megahertz results in practical array spacing dimensions. This is due to the fact that the velocity of sound in plastic is significantly lower than in glass, resulting in a correspondingly lower wavelength of the acoustic shear wave in plastic. Accordingly, the array spacing is much less than would be experienced in a corresponding frequency in glass. Accordingly, a practical array spacing dimension can be realized at lower frequencies in plastic. The preferred range of frequencies of the present invention is from about 0.2 to 2.0 MHz. Additionally, because a lower frequency is utilized in plastic substrates, the controller and signal processing electronics are inherently less expensive, resulting in an overall reduction in cost with at least equal performance of the overall touch panel array.

Figure 3A:
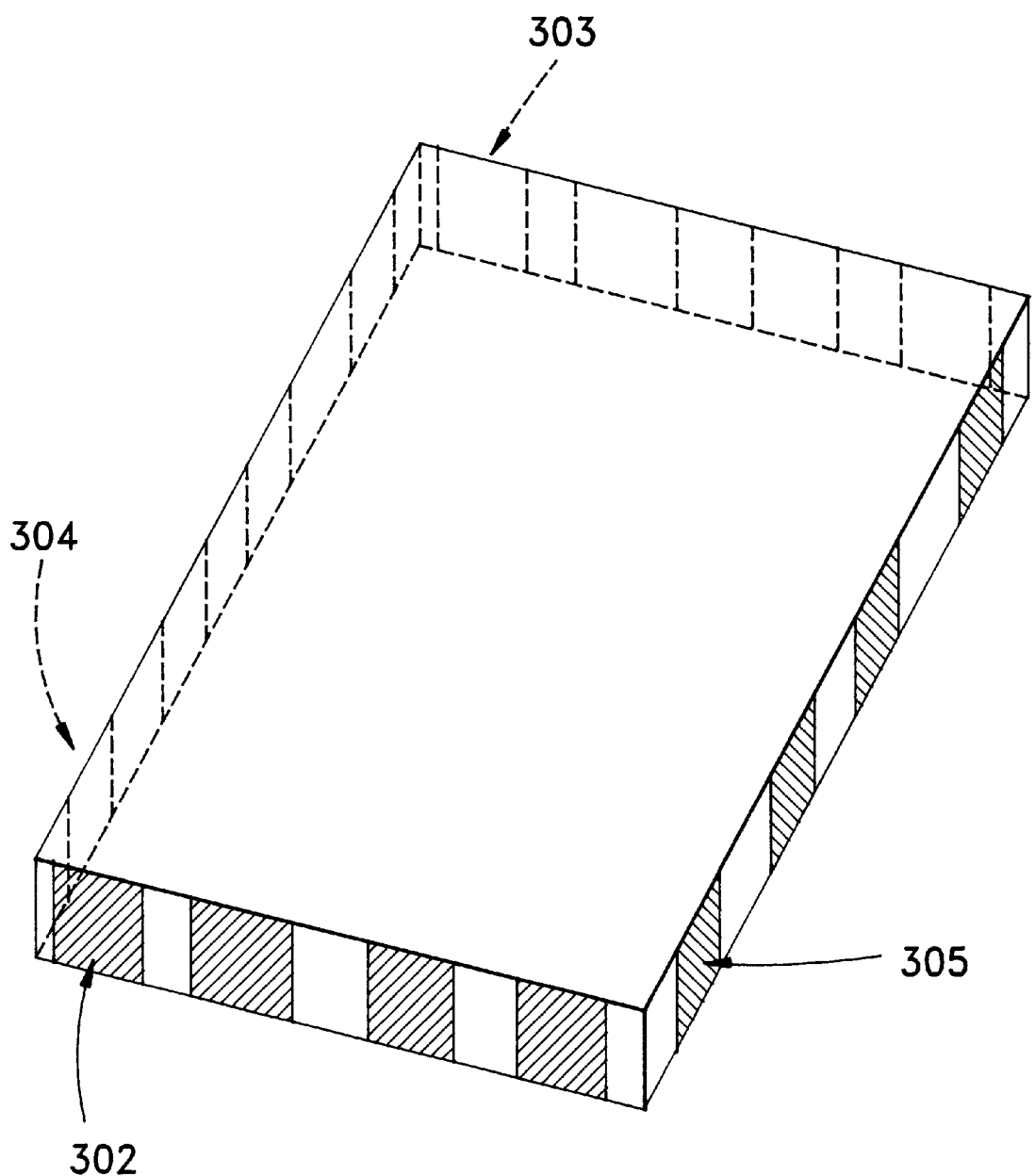
FIG. 3a shows an embodiment of the present invention in which discrete transducers are about the edges of the substrate enough of the reflective arrays.
Figure 3B:
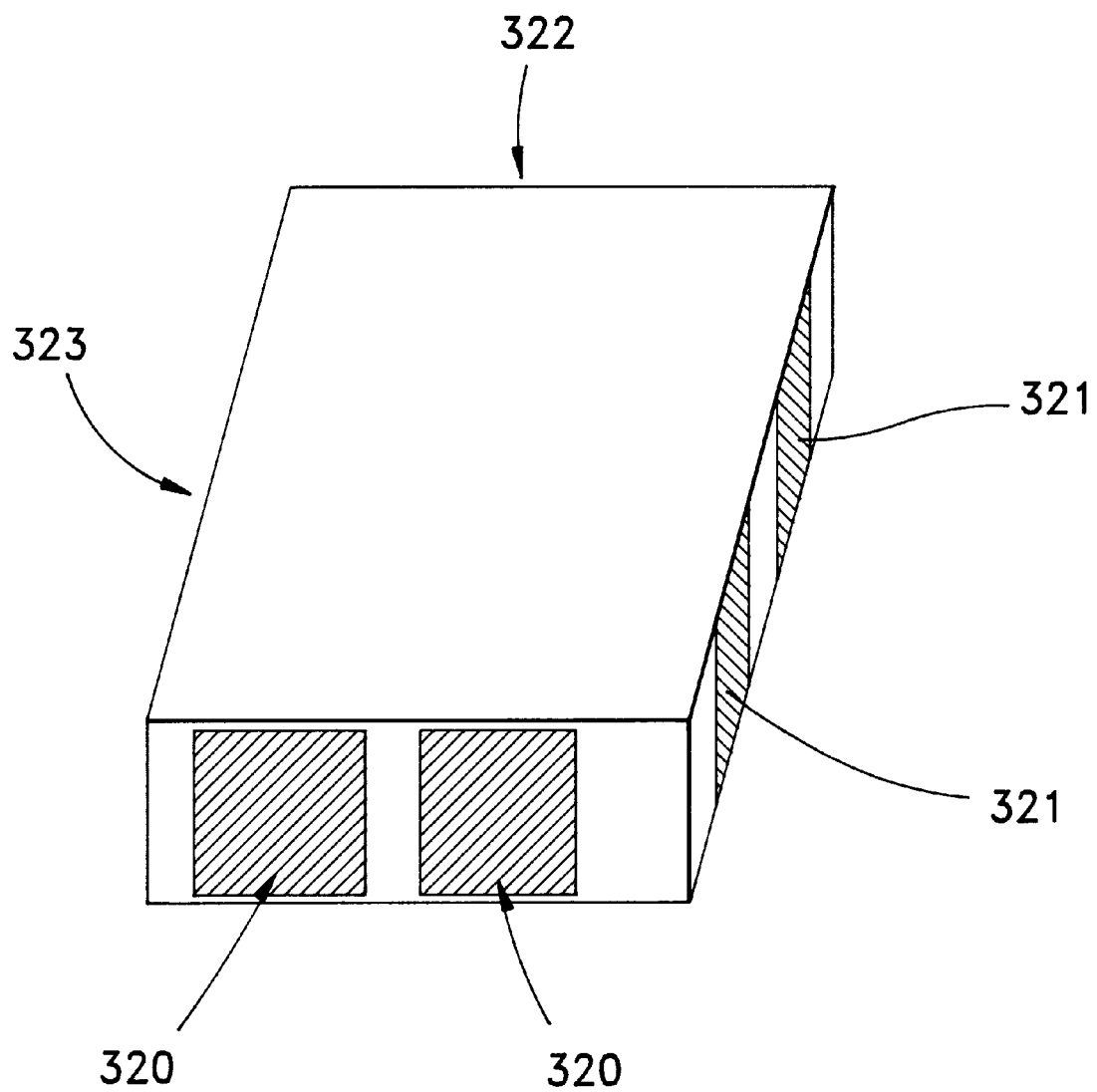
FIG. 3b is the preferred embodiment of the present invention using discrete transducers.

Turning to FIG. 3a, a substrate 301 of plastic material similar to that shown in FIGS. 1 and 2 has transducer arrays along the outer edges. The transducers shown at 302 are coupled to transducers along an opposite side shown at 303 while transducers 304 are coupled to corresponding transducers 305. In operation, the use of discrete transducers can be made feasible only if the cost of the individual transducers can be maintained at low enough level. The use of PZT transducers appears to have met this particular demand in cost. In the discrete transducer function, it is possible for an acoustic wave to be sent from transducer 302 in the Y direction and picked up by a transducer 303. Correspondingly, a transducer 304 can send a signal in the X direction to a transducer 305 where the signal is picked up. The use of discrete transducers has attendant advantages, particularly in performance and cost when compared to the array versions. First of all, the discreet transducer enables a signal-to-noise ratio which is substantially greater than that achieved for the arrays, and this enables the fabrication of large touch panels when compared to that available to arrays. The preferred embodiment of the discrete transducer embodiment id as shown in FIG. 3b. The transducers 320 effect the sensing of the y-coordinate while the transducers effect the sensing of the x-coordinate. The transducers 320 and 321 are used for both transmission and reception of acoustic signals with the edge surfaces 322 and 323, respectively effecting the reflection of the transmitted wave. The discrete transducer creates discrete paths, with the transducers being excited sequentially as is disclosed in U.S. Patent to Johnson, et al. (U.S. Pat. No. 3,673,327), the disclosure of which is incorporated herein by reference. Signal processing is less complex when compared to the array version because the signal to noise ratios are greater for sensors of a given size. Hence the signal processing costs are less. Resolution of the signal depends on the number of transducers per unit length. The greater the resolution desired the greater the number of transducers per unit length along the edge of the substrate. In contrast, in the reflective array version the resolution is independent of the number of transducers. When the combined costs of the transducers and signal processing electronics are compared for discrete and reflective array versions, the discrete version is desirable for low resolution applications because the overall cost is less.

The invention having been described in detail, it is clear that modifications and variations to the basic disclosure of the present invention are within the purview of one of ordinary skill of the art. To the extent that modifications and variations of the basic teaching of a plastic touch panel array are within the purview of the ordinary skill artisan after having had the benefit of reviewing the present disclosure, such variations and modifications are deemed within the scope of the present invention.

What is claimed is:

1. A touch panel for use in a touch position sensor, comprising:

a substrate of polystyrene having four edges and a thickness chosen to support transverse acoustic waves;

at least one transducer disposed on two of said edges, each transducer for transmitting transverse acoustic waves having a frequency in the range of about 0.2 to 2.0 Megahertz to and receiving transverse acoustic waves having a frequency in the range of about 0.2 to 2.0 Megahertz from the substrate; and selectively disposed reflective arrays for reflecting a portion of said transverse acoustic waves.

2. A touch panel as recited in claim 1 were in said substrate has a thickness which will not support surface acoustic waves.

3. A touch panel as recited in claim 1 were in said transverse acoustic zeroth order horizontally polarized shear waves.

4. A touch panel as recited in claim 1 wherein said reflective arrays are gratings disposed peripherally about said substrate.

5. A touch panel as recited in claim 1, wherein said substrate has a hard coat material disposed thereon.

6. A touch panel for use in a touch position sensor, comprising:

a substrate of polystyrene having four edges and a thickness chosen to support transverse acoustic;

at least one transducer selectively disposed on each of said edges, each transducer for transmitting transverse acoustic waves having a frequency in the range of about 0.2 to 2.0 Megahertz to or receiving transverse acoustic waves having a frequency in the range of about 0.2 to 2.0 Megahertz from the substrate.

7. A touch panel as recited in claim 6 wherein transducers on a first edge of said substrate are coupled selectively to transducers on a second edge of said substrate and transducers disposed on a third on said substrate are coupled selectively to transducers on a forth edge to effect the transmission and reception of transverse acoustic waves.

8. A touch panel as recited in claim 6 where in said substrate has a thickness which will not support surface acoustic waves.

9. A touch panel as recited in claim 6 where in said transverse acoustic waves are zeroth order horizontally polarized shear waves.

10. A touch panel as recited in claim 6 where in said transducers are lead-zirconium.

* * * * *